United States Patent [19]

Kobashi et al.

[11] Patent Number: 4,805,704

[45] Date of Patent: Feb. 21, 1989

[54] ROTARY TILLING DEVICE

[75] Inventors: Teruhisa Kobashi; Ichiro Kobashi; Yoshio Touki; Yasuhiro Kobiki, all of Okayama, Japan

[73] Assignee: Kobashi Kogyo Co., Ltd., Okayama, Japan

[21] Appl. No.: 916,018

[22] Filed: Oct. 6, 1986

[30] Foreign Application Priority Data

Oct. 12, 1985 [JP] Japan .................................. 60-227085
Nov. 20, 1985 [JP] Japan .................................. 60-261957

[51] Int. Cl.$^4$ ...................... A01B 33/02; A01B 33/14
[52] U.S. Cl. ...................................... 172/91; 172/123; 172/125; 172/45; 172/545; 56/12.7
[58] Field of Search .................. 172/45, 556, 123, 125, 172/91, 96, 42, 545, 47; 56/12.7

[56] References Cited

U.S. PATENT DOCUMENTS

| 3,028,919 | 4/1962 | Smith | 172/47 |
| 3,128,729 | 4/1964 | Henson | 172/123 |
| 3,557,880 | 1/1971 | Van der Lely | 172/125 |
| 4,492,271 | 1/1985 | Doering | 172/125 |
| 4,519,459 | 5/1985 | Reaume | 172/125 |
| 4,556,113 | 12/1985 | Saito | 172/123 |
| 4,611,669 | 9/1986 | Ballard | 172/91 |

FOREIGN PATENT DOCUMENTS 2551857 6/1977 Fed. Rep. of Germany ........ 172/96

Primary Examiner—Richard J. Johnson
Attorney, Agent, or Firm—Martin A. Farber

[57] ABSTRACT

A rotary tilling device has a cutting device having a plurality of cutters each of which is rotatably mounted on a supporting member. The cutter has a vertical portion and a lateral portion at an end of the vertical portion and has edges on both sides of the vertical and lateral portions. The cutter is held by a stopper in a tilling position when rotated in a tilling direction, and is released in a grass cutting position when rotated in the opposite direction.

4 Claims, 6 Drawing Sheets

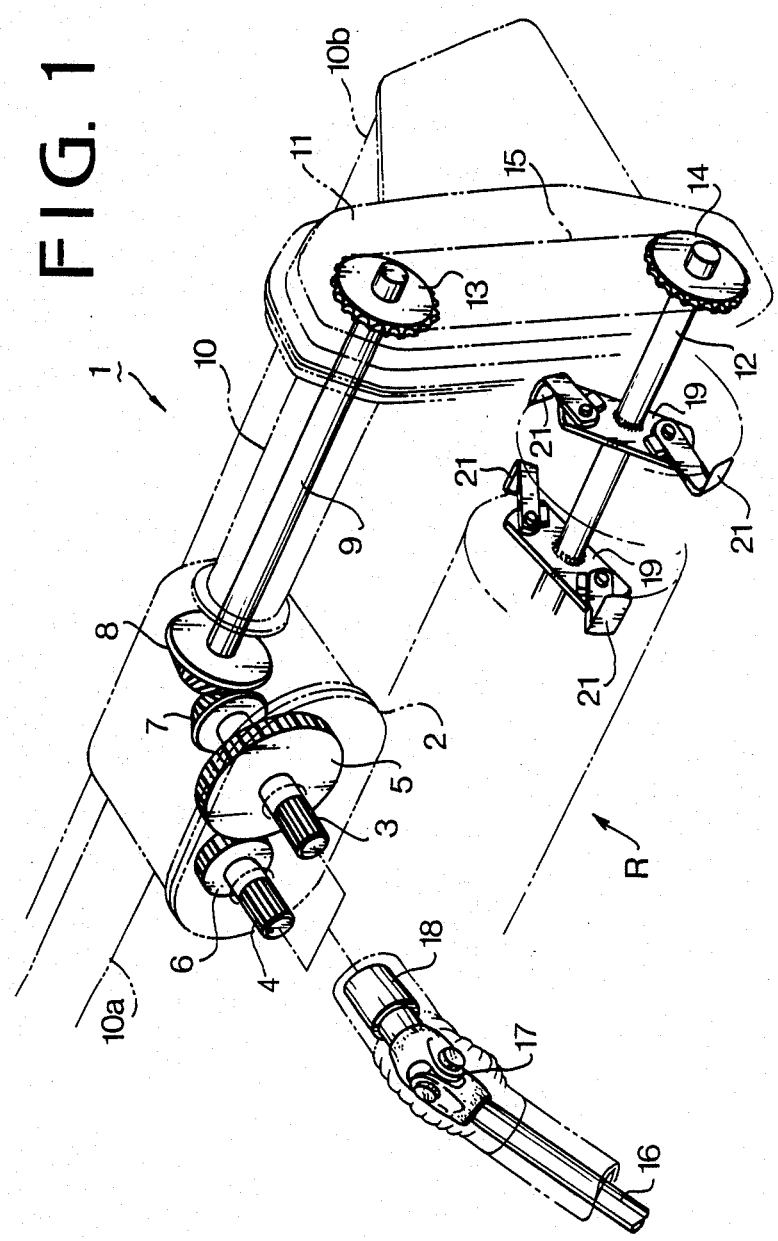

ROTARY TILLING DEVICE

BACKGROUND OF THE INVENTION

The present invention relates to a rotary tilling device having a rotary cutting device.

The rotary cutters in the rotary cutting device rotate downwardly or upwardly in the soil to break up the surface soil. The conventional rotary tilling device is used for only cultivating the soil and is not constructed to perform other work such as mowing.

SUMMARY OF THE INVENTION

Accordingly, an object of the present invention is to provide a rotary tilling device which serves also as a mower.

To this end, each cutter of a rotary tilling device has edges on the opposite sides and the outer end thereof and the tilling device is arranged to rotate the rotary cutter in the opposite directions so as to till in a direction and to mow in the other direction.

Another object of the present invention is to provide a tilling device in which each cutter has a bottom arranged so as not to touch the surface of the soil, so that the edge of the cutter does not deflect from the soil and cuts the grass.

According to the present invention, there is provided a rotary tilling device comprising, a rotary shaft rotatably supported on frame means, a plurality of supporting members secured to the rotary shaft, and at least two cutters rotatably mounted on each of the supporting members at opposite positions thereof. Each of the cutters has a vertical portion, at one end portion of which the cutter is rotatably mounted on the supporting member, and a lateral portion bending at the other end of the vertical portion in the axial direction of the rotary shaft, and has edges on both sides of the vertical and lateral portions.

The device further comprises holding means provided on the supporting member for holding the cutter in a tilling position and for releasing the cutter in a grass cutting position, transmitting means for transmitting power of a tractor to the rotary shaft to rotate it, and inverting means for selectively inverting the direction of the rotation of the rotary shaft.

The other objects and features of this invention will become understood from the following description with reference to thee accompanying drawings.

BRIEF DESCRIPTION OF THE DRAWINGS

FIG. 1 is a perspective view showing a part of a rotary tilling device of the present invention;

FIG. 4b is an enlarged view showing a part of FIG. 4a;

DETAILED DESCRIPTION OF THE DRAWINGS

Figure 2A:
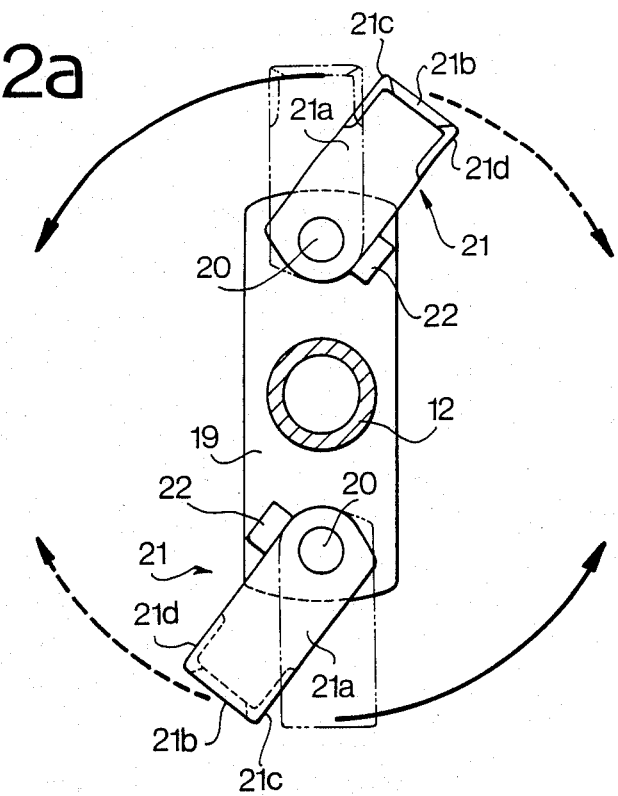
FIG. 2a is a side elevational view of a supporting member and cutters of the rotary tilling device of FIG. 1.
Figure 2B:
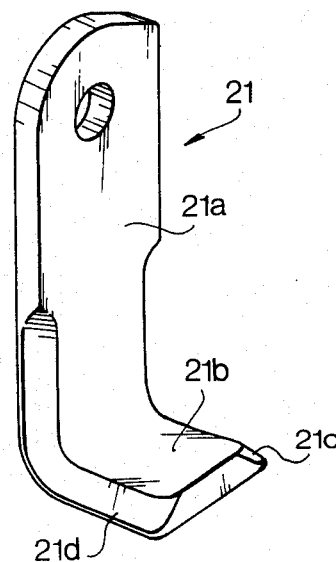
FIG. 2b is a perspective view showing a cutter.
Figure 3:
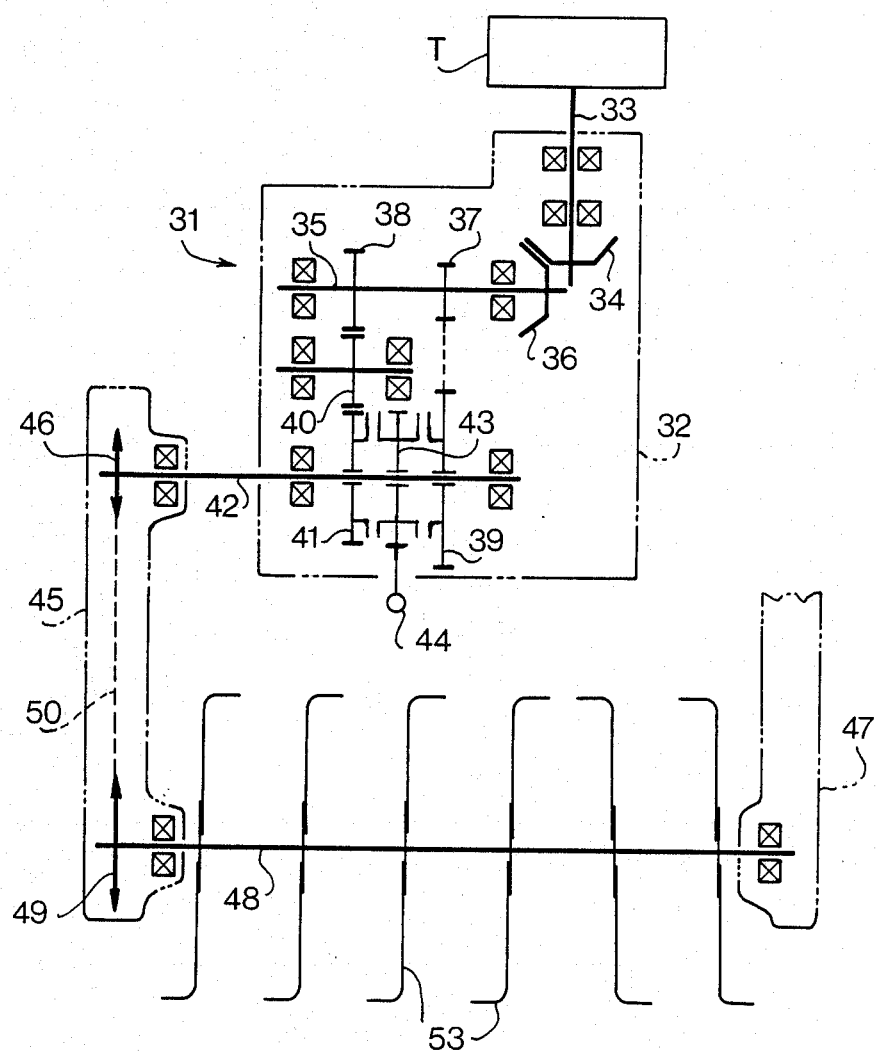
FIG. 3 is a schematic diagram showing a power transmission system of a second embodiment of the present invention.

Referring to FIG. 1, a rotary tilling device 1 according to the present invention is adapted to be drawn by a tractor and attached thereto by a three-point linkage so as to be lowered and raised. The rotary tilling device 1 has a gearbox 2 provided at a middle portion thereof, cylindrical frames 10, 10a secured to both sides of the gearbox 2, a downwardly extending chain case 11 from the end of the frame 10, and a cover 10b secured to the members 2, 10 and 11. The gearbox 2 has a pair of parallel input shafts 3 and 4 projecting toward the tractor. The input shafts are adapted to be selectively engaged with a coupling 18 so as to be operatively connected with the tractor through a universal joint 17, transmission shaft 16, and power take-off shaft. Secured to the input shaft 3 is a large gear 5 and to the input shaft 4 is a small gear 6, which are in mesh with each other. Also secured to the input shaft 3 is a bevel gear 7 which is engaged with a bevel gear 8 securely mounted on an output shaft 9. The output shaft 9 is rotatably mounted in the frame 10 and has a sprocket wheel 13 at an end portion. The sprocket wheel 13 is connected to a sprocket wheel 14 fixedly mounted on a rotary shaft 12 through a chain 15. The rotary shaft 12 is rotatably supported on lower portions of the chain case 11 and a supporting frame (not shown) provided at the other side of the frame 10a.

A rotary cutting device R has a plurality of supporting members 19 radially and securely mounted on the rotary shaft 12. As shown in FIG. 2a, each supporting member 19 is a rectangular plate, the center portion of which is penetrated by the rotary shaft 12. On opposite end portions, cutters 21 are pivotally supported by pivot pins 20, respectively. As shown in FIG. 2a, each cutter 21 is made by bending a rectangular metal plate to form a vertical portion 21a and a lateral portion 21b thereby forming an L shape section. Edges 21c and 21d are formed on opposite sides of a lower portion of the vertical portion 21a and on opposite sides of the lateral portion 21b, edge 21c being for tilling and 21d for mowing. A stopper 22 is provided on the supporting member 19 to receive the load exerted on the cutter 21 and to hold it at a tilling position shown by a solid line in FIG. 2a, at which the cutter has an angular disposition for tilling, when the rotary shaft 12 and the supporting member 19 are rotated in a tilling direction (downward cutting direction) shown by arrows in solid line. The cover 10b is provided over the front and rear portions of the rotary cultivating device 1.

For the tilling operation, input shaft 4 is connected to the coupling 18. When the input shaft 4 is rotated, the input shaft 3 is rotated at a lower speed than the input shaft 4 by the reduction gears 6 and 5. Accordingly, the rotary shaft 12 is rotated at a low speed in the tilling direction shown by the arrows in solid line in FIG. 2a. As a tractor draws the rotary tilling device 1, the edge 21c of each cutter 21 cuts through the soil to cultivate the surface of the soil. The stopper 22 holds the cutter 21 at one side of a base portion thereof preventing the cutter 21 from further rotating in the counter-tilling direction due to the load exerted on the cutter 21. Consequently, tilling and fragmenting of the soil or puddling of the paddy is achieved in a well-known manner.

For the grass cutting operation, the input shaft 3 is connected to the coupling 18. Therefore, the rotary shaft 12 is rotated in the opposite direction at a higher speed so that each cutter 21 rotates in the mowing direction shown by arrows in dashed line. Due to the centrifugal force, each cutter 21 is held at a radial position shown also by a dashed line. Accordingly, grass growing on unplowed land is cut in the same manner as a conventional rotary flail-type cutter. In such a state, the gear 6 and the shaft 4 are idly rotated.

Preferred rotational speed of the rotary shaft 12 is about 200 r.p.m. during the tilling operation and about 1000 to 2000 r.p.m. during the grass cutting operation.

FIGS. 3 to 7 show another embodiment of the present invention. The rotary tilling device 31 comprises a gearbox 32, a chain case 45 connected with an output shaft 42 of the gearbox 32, and rotary shaft 48 rotatably supported on the chain case 45 and a supporting frame 47 provided at the other side of the machine. The gearbox 32 has an input shaft 33, one end of which is connected to a tractor T by way of a power take-off shaft, transmission shaft and universal joint like the first embodiment. A bevel gear 34 fixedly mounted on the other end of the input shaft 33 engages with a bevel gear 36 mounted on an intermediate shaft 35. A gear 37 secured to the intermediate shaft 35 is engaged with a gear 39 relatively rotatably mounted on the output shaft 42, providing a large gear reduction ratio. A gear 38 also securely mounted on the intermediate shaft 35 engages an idler gear 40 which in turn engages a counter gear 41 relatively rotatably mounted on the output shaft 42. Between the gears 39 and 41, a shift gear 43 is slidably secured by a spline engagement to the output shaft 42. The gear 43 has teeth 43a, 43b. The respective teeth are selectively engaged with teeth 39a provided on a side of the gear 39 or with teeth 41a on the gear 41 upon shifting the shift gear to the left or right respectively, in order to operatively connect the gear 39 or 41 with the output shaft 42. A shift lever 44 projecting from the gear box 32 is connected with the slidable gear 43 for the selecting operation. The output of the gear box 32 is transmitted to the rotary shaft 48 through a chain mechanism housed in the chain case 45, comprising a sprocket wheel 46 mounted on the output shaft 42, a sprocket wheel 49 mounted on the rotary shaft 48 and a chain 40 disposed therebetween. A plurality of supporting members 51, each supporting a pair of cutters 53 which serve both as tiller and grass cutter, are secured on the rotary shaft 48.

Figure 4A:
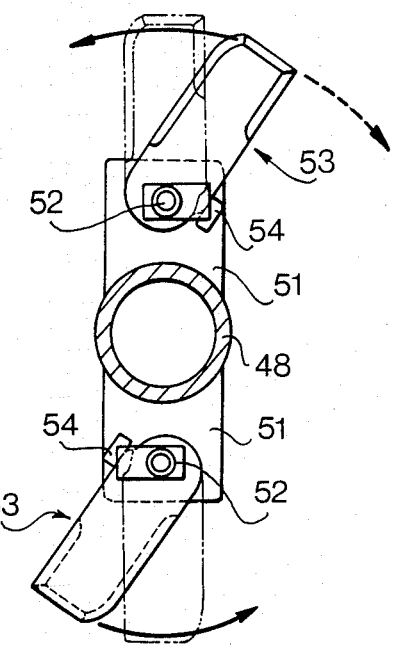
FIG. 4a is a side elevational view of a supporting member and cutters in the second embodiment.
Figure 4B:
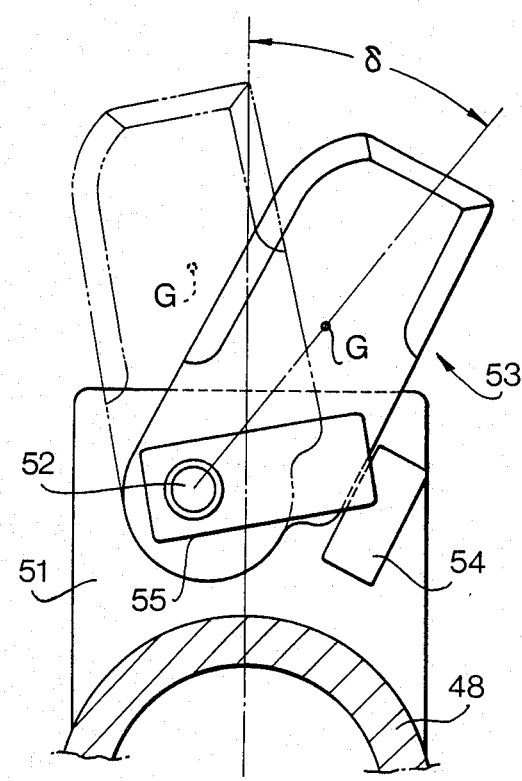
Figure 7A:
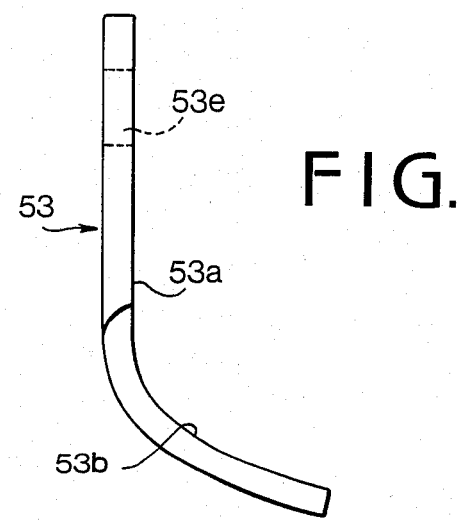
FIG. 7a is a front elevational view of a cutter.
Figure 7B:
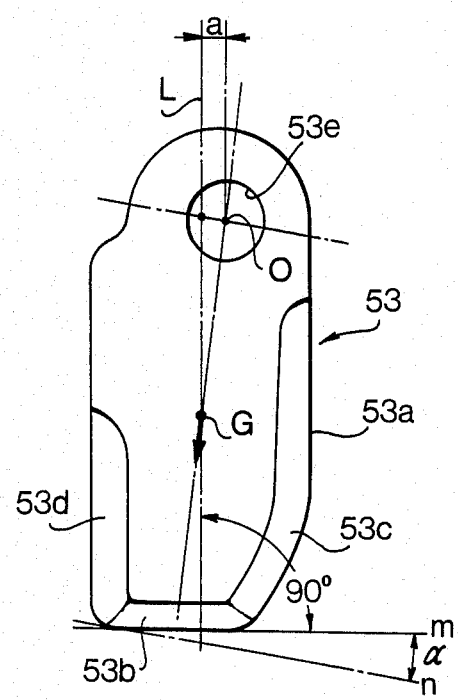
FIG. 7b is a side elevational view of the cutter.

Referring to FIGS. 4a and 4b each cutter 53 is pivotally mounted by a bolt 52 at a base end portion of the supporting member 51. As shown in FIGS. 7a and 7b, each cutter 53 has a vertical portion 53a and a lateral portion 53b, edges 53c, 53d like the cutter 21 of the first embodiment of the invention.

Figure 5:
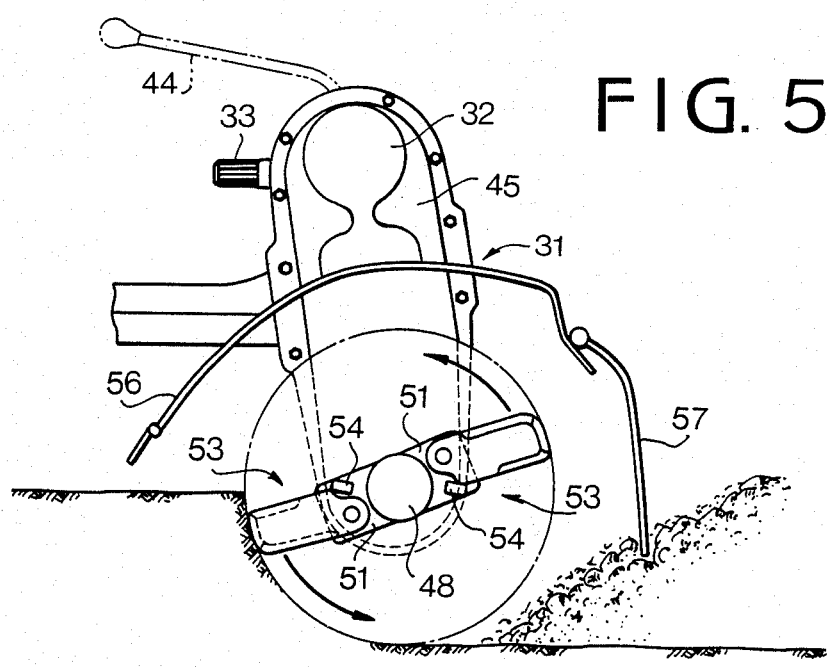
FIG. 5 is a side elevational view of the rotary tilling device during tilling operation.
Figure 6:
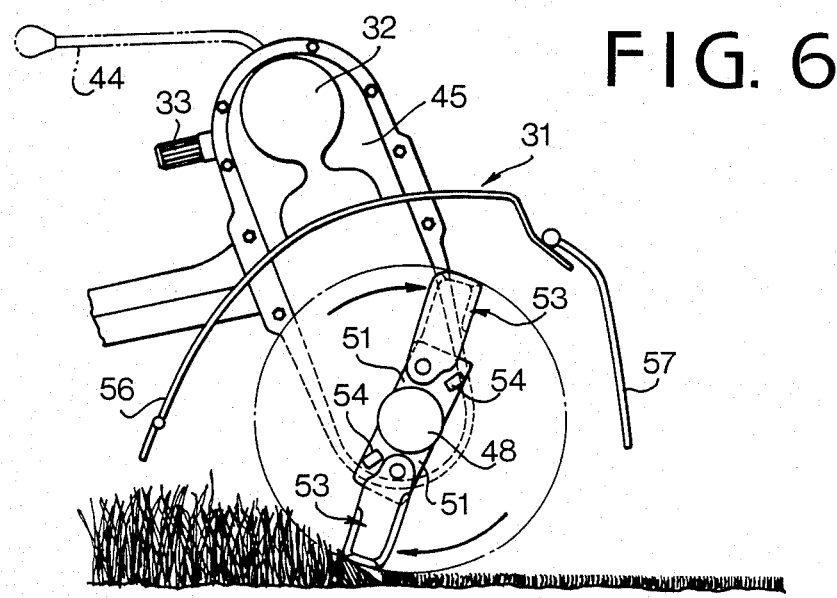
FIG. 6 is a side elevational view of the rotary tilling device during grass cutting operation.

A stopper 54 is provided on the supporting member 51 so as to prevent the cutter 53 from further rotating in the counter-tilling direction shown by arrows in solid line in FIG. 4a. The stopper 54 is so positioned to assure that the cutter 53 is inserted into the soil at a certain entering angle δ (FIG. 4b) for efficient inverting and turning of the soil. In addition, a spring plate 55 is secured together with the cutter 53 to the supporting member 51 by the bolt 52 to prevent the deflection of the cutter in the axial direction of the bolt. As shown in FIG. 5, covers 56 and 57 are provided above the front and rear portions of the rotary tiller device 31.

Figure 8:
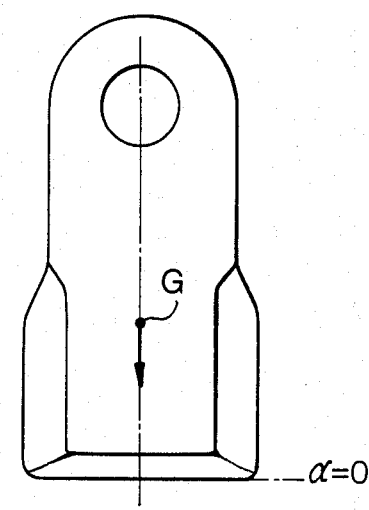
FIG. 8 is a side elevational view of a conventional cutter blade for a rotary mower.

For effective grass cutting, it is preferable to mount the cutter 53 on the supporting member 51 so as to form a certain angle between the surface of the ground and the bottom of the cutter 53. As shown in FIG. 8, a conventional mower cutter is so arranged that the direction of the centrifugal force coincides with the center line of the cutter. Accordingly, a line m indicating the bottom of the cutter and the center line thereof make a right angle. Therefore, the cutter is apt to deviate from the ground when hitting a lump of soil or a stone thereby leaving the grass as it is on the field. However, in the cutter 53 of the present invention, the center o of a hole 53e for securing the cutter by bolt 52 is deflected by a mm from the center line L. A bottom line m of the cutter 53, which is at a right angle to the center line L, and line n, which is at a right angle to a line indicating the direction of the centrifugal force, passing the center o and the center G of gravity, make an appropriate cutting angle α.

The operation of the machine is described hereinafter.

For the tilling operation, the shift lever 44 is shifted so that the shift gear 43 is in engagement with the gear 39. Accordingly, the power of the engine supplied to the input shaft 33 is transmitted to the output shaft 42 through bevel gears 34 and 36, and gears 37 and 39. The power is further transmitted to the rotary shaft 48 in the same way as the afore-described first embodiment. Accordingly, the rotary shaft 48 is rotated at a low speed in the tilling direction. As shown in FIG. 5, each cutter 53 also rotates in the tilling direction and the stopper 54 prevents the cutter 53 from rotating in the counter tilling direction. Thus, the soil is cultivated by the tilling device.

When the shift lever 44 is shifted to engage the shift gear 43 with the reverse gear 41, the device is in the state for the grass cutting operation.

The direction of the rotation of the rotary shaft 48 is reversed compared to the direction of the rotation of the tilling direction, as shown by the arrow in dashed line in FIG. 4a. Since reverse gear 41 is smaller than gear 39, the speed of the rotation of the rotary shaft 48 is faster than the tilling operation thereby generating a large centrifugal force. Accordingly, the cutter 53 is disengaged from the stopper 54 and rotates about the bolt 52 and is kept at a position shown by a chain line of FIG. 4b. A a result, grass is cut by the cutter 53c. Since the cutter is held by, the centrifugal force, at such a position that the bottom m makes a proper angle α with respect to the surface of the soil, (represented by the line n in FIG. 7b), effective grass cutting is performed.

In the present embodiment, the rotational speed of the rotary shaft is preferably between 200 to 300 r.p.m. for the tilling operation and about 800 r.p.m. for the grass cutting operation.

Although the rotary shaft is rotated in the downward cutting direction for the tilling operation and upward cutting direction for the cutting operation, the direction of the rotation may be reversed. Further, a holder may be provided in place of the stopper for supporting the cutter at a predetermined position during tilling by holding the cutter. The holder should be arranged to release the cutter while cutting grass.

While the presently preferred embodiments of the present invention has been shown and described, it is to be understood that this disclosure is for the purpose of illustration and that various changes and modifications may be made without departing from the spirit and scope of the invention as set forth in the appended claims.

What is claimed is:

1. A rotary tilling device having a frame drawn by a tractor in a travelling direction comprising:
- a rotary shaft disposed in a lateral direction with respect to the travelling direction and horizontal with respect to ground, and rotatably supported on the frame;
- a plurality of supporting members secured to the rotary shaft;
- at least two cutters respectively rotatably mounted on each of said supporting members at diametrically opposite positions of each of said supporting members;
- each of the cutters having a radial portion, at one end portion of said radial portion the cutter being rotatably mounted at a pivot on the supporting member, and having a lateral portion bent at the other end portion of the radial portion in the axial direction of the rotary shaft, and having a tilling edge on at least part of a front side of the radial and lateral portions of the cutter and a mowing edge on at least part of a rear side of the radial and lateral portions of the cutter;
- separate stop means provided on the supporting member at a position spaced from the shaft and adjacent the pivot of the cutter so that the same radial side portion of the cutter as the mowing edge abuts on the stop means, for holding the cutter in a tilling position and respectively for releasing the cutter into a freely pivoted grass-cutting position;
- transmitting means for transmitting power of the tractor to the rotary shaft to rotate the rotary shaft;
- reversing and speed changing means for selectively reversing the direction of rotation of the rotary shaft, so as to rotate the rotary shaft in a downward tilling rotary direction at a low speed for tilling operation with the tilling edge and, respectively, in an opposite rotary mowing direction at a higher speed for mowing operation with the mowing edge; and
- each of said cutters is so arranged that a bottom surface of the lateral portion of a cutter is angled to a horizontal surface of the soil in the grass cutting position.

2. The rotary tilling device according to claim 1 wherein the supporting member has a rectangular shape.

3. The rotary tilling device according to claim 1, wherein
the stop means is a stopper provided on the supporting member.

4. The rotary tilling device according to claim 1, wherein
the reversing and speed changing means comprises a pair of input shafts which are connected with each other by respective gears, and are selectively coupled to an output shaft of the tractor.

* * * * *